US009456580B2

(12) United States Patent
Ma et al.

(10) Patent No.: US 9,456,580 B2
(45) Date of Patent: Oct. 4, 2016

(54) FOLDABLE BAG FRAME AND PET BAG USING SAME

(71) Applicant: TONGFU MANUFACTURING CO., LTD., Nanjing, Jiangsu (CN)

(72) Inventors: Yaomin Ma, Nanjing (CN); Wen Zhang, Nanjing (CN)

(73) Assignee: TONGFU MANUFACTURING CO., LTD., Jiangsu (CN)

( * ) Notice: Subject to any disclaimer, the term of this patent is extended or adjusted under 35 U.S.C. 154(b) by 0 days.

(21) Appl. No.: 14/767,012

(22) PCT Filed: Dec. 31, 2014

(86) PCT No.: PCT/CN2014/095902
§ 371 (c)(1),
(2) Date: Aug. 11, 2015

(87) PCT Pub. No.: WO2015/070822
PCT Pub. Date: May 21, 2015

(65) Prior Publication Data
US 2016/0014994 A1   Jan. 21, 2016

(30) Foreign Application Priority Data

Nov. 13, 2013  (CN) .................... 2013 2 0721353 U

(51) Int. Cl.
*A01K 1/03* (2006.01)
*A01K 1/02* (2006.01)
*A01K 1/00* (2006.01)

(52) U.S. Cl.
CPC ............... *A01K 1/03* (2013.01); *A01K 1/0035* (2013.01); *A01K 1/0254* (2013.01)

(58) Field of Classification Search
CPC .. A01K 1/0254; A01K 1/033; A01K 1/0035; A01K 1/0245; A01K 1/03; A01K 1/034; A47D 13/063

USPC ....... 119/498, 499, 474, 491, 492, 496, 497, 119/504; 135/130, 127, 120.3, 121, 126, 135/128, 143, 123; 5/99.1
See application file for complete search history.

(56) References Cited

U.S. PATENT DOCUMENTS

| | | | | |
|---|---|---|---|---|
| 4,974,621 A | * | 12/1990 | Lerma ..................... | E04H 15/46 135/116 |
| 6,125,483 A | * | 10/2000 | Stroud ................ | A47D 13/063 135/128 |

(Continued)

FOREIGN PATENT DOCUMENTS

| CN | 201045927 Y | 4/2008 |
|---|---|---|
| CN | 201199840 Y | 3/2009 |
| CN | 203538064 U | 4/2014 |

OTHER PUBLICATIONS

Mar. 10, 2015 Search Report issued in International Patent Application No. PCT/CN2014/095902.

*Primary Examiner* — Yvonne Abbott-Lewis
(74) *Attorney, Agent, or Firm* — Oliff PLC

(57) ABSTRACT

A foldable bag frame and a pet bag using same are presented. The foldable bag frame includes four top support bars connected end-to-end in sequence, four bottom support bars connected end-to-end in sequence, and connecting rods. Each of the connecting rods consists of two hingedly-connected short-segment connecting rods. The foldable bag frame further includes a sleeve slidable along the connecting rod, and a spring fixedly connected to one end of the sleeve and sleeved over an outer side of the connecting rod, the other end of the spring being connected to the non-fixed end of a short-segment connecting rod. When the spring is in an initial state, the sleeve connected thereto covers the hinged portion of the connecting rod. By controlling foldability of the connecting rods, folding of the frame is conveniently achieved, making it possible to use a strong rigid material for the frame to meet stability during use.

18 Claims, 4 Drawing Sheets

(56) References Cited

U.S. PATENT DOCUMENTS

| | | | | |
|---|---|---|---|---|
| 6,457,438 B1 * | 10/2002 | Baker | ............... | A01K 1/034 119/452 |
| 7,044,083 B2 * | 5/2006 | Farmer | ............ | A01K 1/0254 119/474 |
| 7,594,285 B2 * | 9/2009 | Chen | ............... | A47D 13/063 248/167 |
| 7,802,540 B2 * | 9/2010 | Jakubowski | ......... | A01K 1/0254 119/497 |
| 8,418,653 B2 * | 4/2013 | Qiu | ..................... | A01K 1/03 119/496 |
| 2005/0229866 A1 * | 10/2005 | Simpson | ............ | A01K 1/0245 119/499 |
| 2008/0134985 A1 | 6/2008 | Jakubowski et al. | | |

* cited by examiner

FOLDABLE BAG FRAME AND PET BAG USING SAME

BACKGROUND

1. Technical Field

The present invention relates to the field of articles for daily use, particularly to the field of accessories, and more particularly to a foldable bag frame and a pet bag using same.

2. Related Art

A pet bag, which may be specifically considered to be a dog bag, is an auxiliary tool for carrying animals. Because the pet bag does not need to be maintained in unfolded state for a long time, it is desired that the pet bag be conveniently folded and stored when not in use, and be unfolded quickly for use when needed.

How to provide good foldability and stability during use is a problem to be solved. Considering the structural composition of the pet bag, the key to this problem is to find a novel frame that meets such requirements.

SUMMARY

In view of the problem that pet bags, especially dog bags in the art are inconvenient to use because bags whose frame is made of a soft and easily foldable material are prone to collapse and deform while bags whose frame is made of a strong rigid material have poor foldability and sometimes require detachment of joint components during use, the present invention provides a novel foldable bag frame, comprising four top support bars connected end-to-end in sequence and four bottom support bars connected end-to-end in sequence, wherein neighboring top support bars are at an angle of 90°, the four top support bars form a rectangular top portion, top-support-bar connection joints are formed at the four vertices of the rectangular top portion, neighboring bottom support bar are at an angle of 90°, the four bottom support bars form a rectangular bottom portion, bottom-support-bar connection joints are formed at the four vertices of the rectangular bottom portion, upper-end connection protrusions are formed at the bottom of the top-support-bar connection joints, lower-end connection protrusions are correspondingly formed at the top of the bottom-support-bar connection joints, the upper-end connection protrusions and the lower-end connection protrusions each have a connecting-rod mounting groove correspondingly formed therein, and a shaft hole is correspondingly formed on a side wall of the mounting groove; further comprising connecting rods, wherein each of the connecting rods consists of two hingedly-connected short-segment connecting rods, the non-fixed end of each of the short-segment connecting rods protrudes to form a mounting protrusion that matches the connecting-rod mounting groove, a pin shaft mounting hole is formed on the mounting protrusion, the mounting protrusion is inserted into the mounting groove, and the connecting rod is separately fixed to the top support bar and the bottom support bar by means of a pin shaft; and further comprising a sleeve slidable along the connecting rod, and a spring fixedly connected to one end of the sleeve and sleeved over an outer side of the connecting rod, the other end of the spring being fixed to the non-fixed end of a short-segment connecting rod, wherein when the spring is in an initial state, the sleeve connected thereto covers the hinged portion of the connecting rod.

The short-segment connecting rods that are hingedly connected have hinge components in general sense.

Further, it is disclosed that the spring is sleeved over the outer side of the upper short-segment connecting rod. The purpose of this is to make it convenient to operate the spring.

Further, it is also disclosed that a fixing lug is further formed on an outer wall of the sleeve. In this way, the sleeve can be pulled by pulling the fixing lug with a rope or the like. This provides better operability for products using the frame, especially for pet bags such as dog bags that have outer coverings.

To ensure the durability of the rope, on the basis of the technical solution of providing the fixing lug, it is disclosed that rope holes for a rope to pass through are correspondingly formed on the top-support-bar connection joints or the bottom-support-bar connection joints. In this way, a position effect is provided.

In addition, another foldable bag frame is disclosed, comprising four top support bars connected end-to-end in sequence and four bottom support bars connected end-to-end in sequence, wherein neighboring top support bars are at an angle of 90°, the four top support bars form a rectangular top portion, top-support-bar connection joints are formed at the four vertices of the rectangular top portion, neighboring bottom support bar are at an angle of 90°, the four bottom support bars form a rectangular bottom portion, bottom-support-bar connection joints are formed at the four vertices of the rectangular bottom portion, upper-end connection protrusions are formed at the bottom of the top-support-bar connection joints, lower-end connection protrusions are correspondingly formed at the top of the bottom-support-bar connection joints, the upper-end connection protrusions and the lower-end connection protrusions each have a connecting-rod mounting groove correspondingly formed therein, and a shaft hole is correspondingly formed on a side wall of the mounting groove; further comprising connecting rods, wherein each of the connecting rods consists of three short-segment connecting rods hingedly connected in sequence, the non-fixed end of each of the short-segment connecting rods protrudes to form a mounting protrusion that matches the connecting-rod mounting groove, a pin shaft mounting hole is formed on the mounting protrusion, the mounting protrusion is inserted into the mounting groove, and the connecting rod is separately fixed to the top support bar and the bottom support bar by means of a pin shaft; and further comprising two sleeves slidable along the connecting rod, and a spring fixedly connected to one end of the sleeve and sleeved over an outer side of the connecting rod, the other end of the spring being separately fixed to the non-fixed ends of the upper short-segment connecting rod and the lower short-segment connecting rod, wherein when the spring is in an initial state, the sleeves connected thereto cover the hinged portions between the upper short-segment connecting rod and the lower short-segment connecting rod and between the hinged portion between the middle short-segment connecting rod and the lower short-segment connecting rod respectively.

Compared with the first technical solution, providing three short-segment connecting rods makes it possible to create larger longitudinal space.

Likewise, on the basis of the technical solution with three short-segment connecting rods, it is also disclosed that a fixing lug is further formed on an outer wall of the sleeve. The function of this is the same as that in the previous technical solution with two short-segment connecting rods.

Likewise, it is also disclosed that rope holes for a rope to pass through are correspondingly formed on the top-support-bar connection joints or the bottom-support-bar connection joints. The technical effect of this is the same as that in the previous technical solution with two short-segment connecting rods.

Further, a pet bag using the above foldable bag frame is particularly disclosed, where a bag body is fixed at an outer layer of the foldable bag frame, the bag body is supported by the foldable bag frame to form a cubic accommodation space, and an opening through which an animal breathes is formed on a side surface of the bag body.

Further, it is further disclosed that the rope is a fabric strap.

To sum up, according to the technical solutions disclosed in the present invention, a strong rigid material can be used for the frame to meet requirements on stability during use, and folding of the frame can be conveniently achieved by controlling folding of the connecting rods.

DETAILED DESCRIPTION

The present invention is described in further detail below with reference to the accompanying drawings and specific embodiments, and it should be appreciated that the following specific embodiments are merely used to illustrate=the present invention, but are not intended to limit the scope of the present invention. It should be noted that as used in the following description, the terms "front," "rear," "left," "right," "upper," and "lower" designate directions in the figures, and the terms "inwardly" and "outwardly" designate directions toward and away from, respectively, the geometric center of the a particular object.

Embodiment 1

Figure 1:
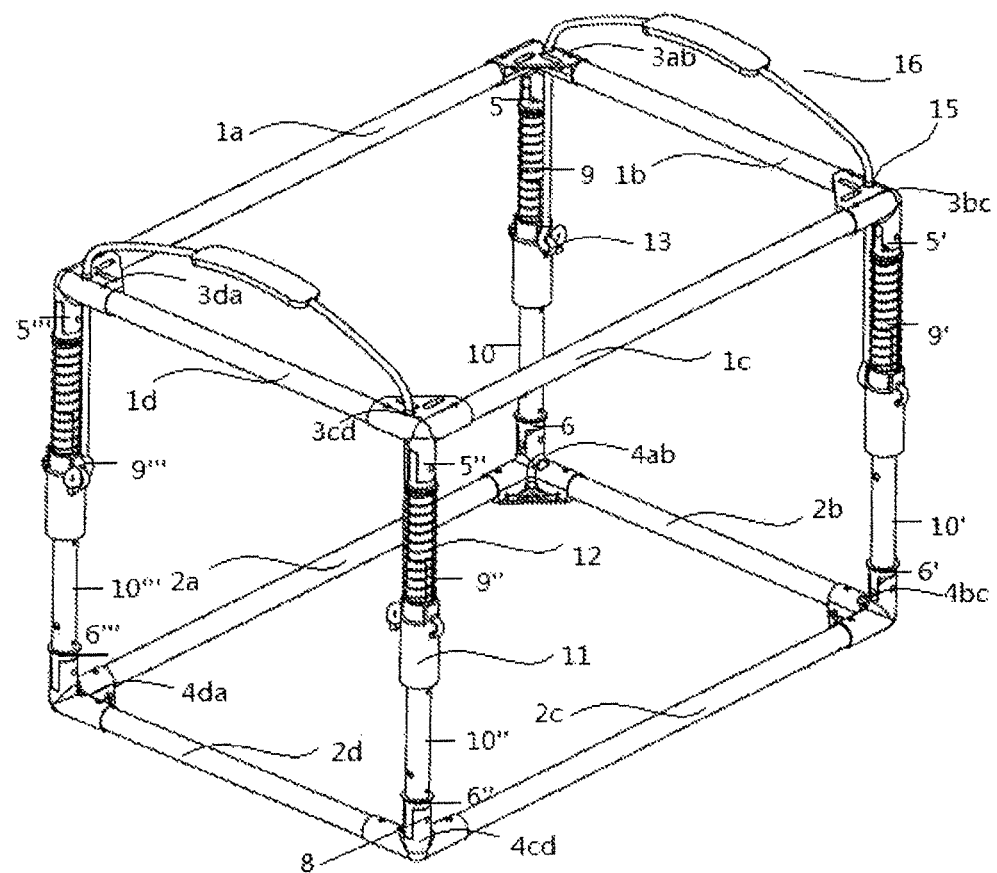
FIG. 1 is a reference diagram illustrating a use state of the present invention.
Figure 2:
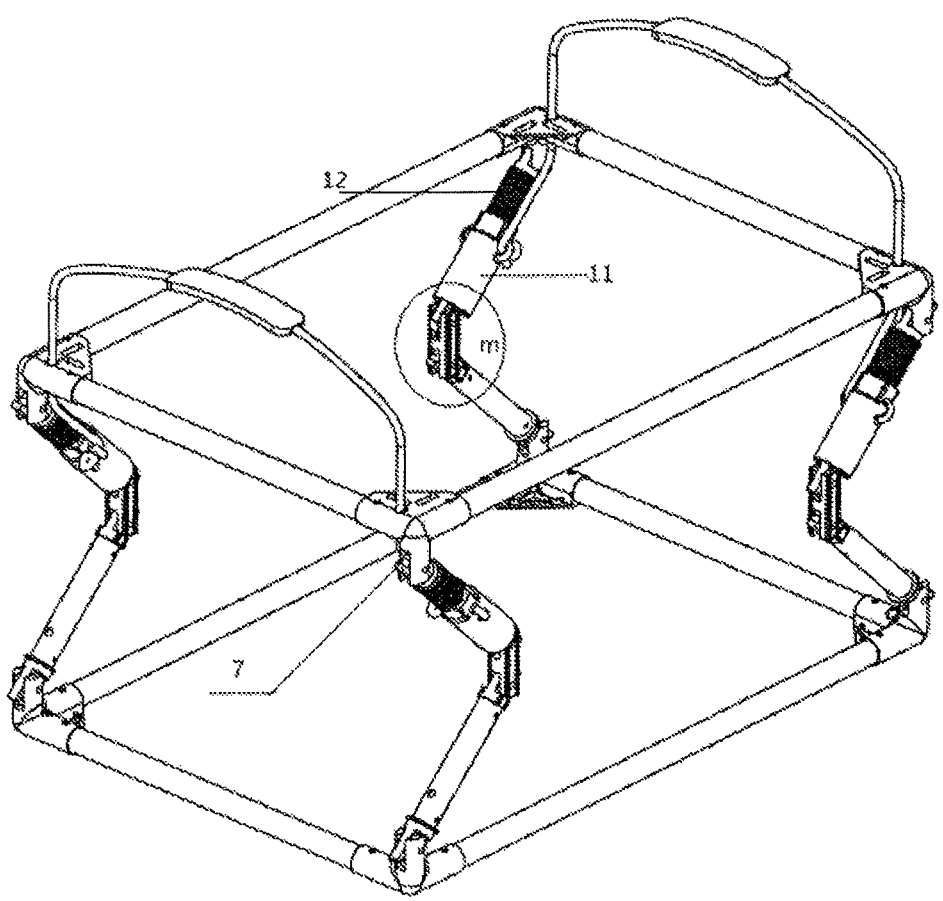
FIG. 2 is a reference diagram illustrating an intermediate state of the present invention between the use state and a folded state.
Figure 3:
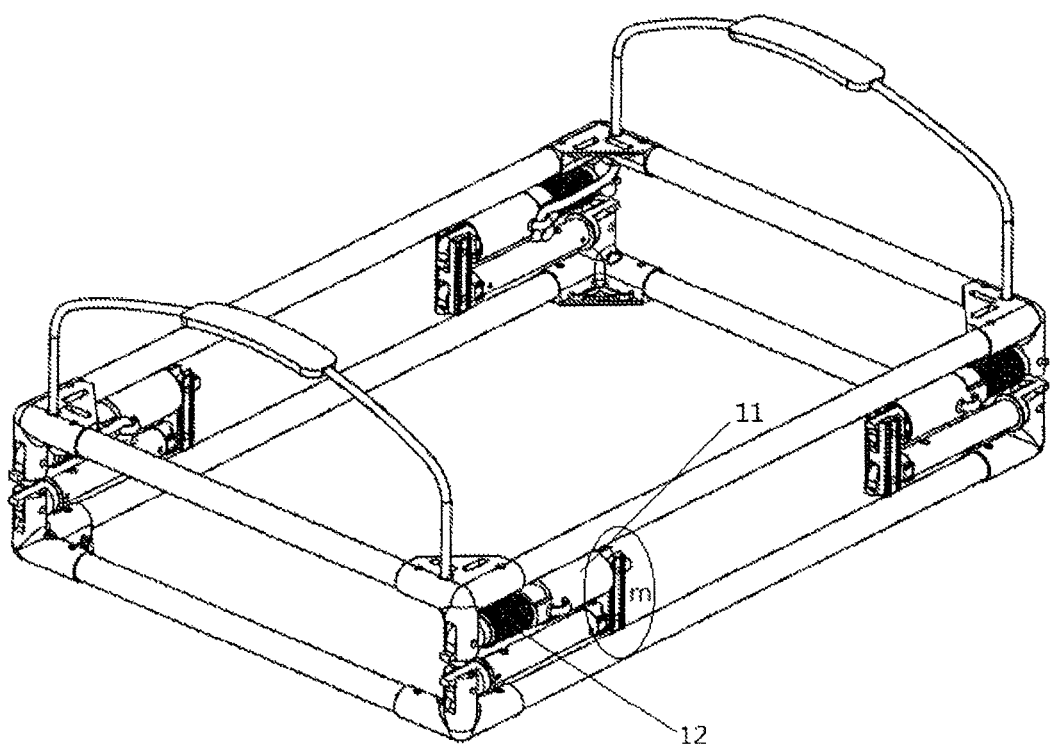
FIG. 3 is a reference diagram illustrating a completely folded state of the present invention.

As shown in FIG. 1, FIG. 2, FIG. 3, a foldable bag frame includes: four top support bars connected end-to-end in sequence, respectively denoted by 1a, 1b, 1c, and 1d in the figures; and four bottom support bars connected end-to-end in sequence, respectively denoted by 2a, 2b, 2c, and 2d. Neighboring top support bars are at an angle of 90°, that is, 1a and 1b are fixed perpendicularly to each other at an angle of 90°, 1b and 1c are fixed perpendicularly to each other at an angle of 90°, 1c and 1d are fixed perpendicularly to each other at an angle of 90°, and 1d and 1a are fixed perpendicularly to each other at an angle of 90°. Therefore, the four top support bars form a rectangular top portion. Top-support-bar connection joints are formed at the four vertices of the rectangular top portion. To be specific, a connection joint 3ab is formed between 1a and 1b, a connection joint 3bc is formed between 1b and 1c, and by analogy, top-support-bar connection joints 3cd and 3da are also formed separately. Neighboring bottom support bar are at an angle of 90°, that is, 2a and 2b are fixed perpendicularly to each other at an angle of 90°, 2b and 2c are fixed perpendicularly to each other at an angle of 90°, 2c and 2d are fixed perpendicularly to each other at an angle of 90°, and 2d and 2a are fixed perpendicularly to each other at an angle of 90°. Therefore, the four bottom support bars form a rectangular bottom portion. Bottom-support-bar connection joints are formed at the four vertices of the rectangular bottom portion. To be specific, a connection joint 4ab is formed between 2a and 2b, a connection joint 4bc is formed between 2b and 2c, and by analogy, bottom-support-bar connection joints 4cd and 4da are also formed separately. Upper-end connection protrusions 5, 5', 5", and 5'" are correspondingly formed at the bottom of the top-support-bar connection joints, that is, 3ab, 3bc, 3cd, and 3da, respectively; lower-end connection protrusions 6, 6', 6", and 6'" are correspondingly formed at the top of the bottom-support-bar connection joints, that is, 4ab, 4bc, 4cd, and 4da, respectively. The upper-end connection protrusions and the lower-end connection protrusions each have a connecting-rod mounting groove 7 correspondingly formed therein, and a shaft hole 8 is correspondingly formed on a side wall of the mounting groove. The foldable bag frame further includes connecting rods, where each of the connecting rods consists of two hingedly-connected short-segment connecting rods, namely, 9, 9', 9", and 9'", and 10, 10', 10", and 10'" that are correspondingly hingedly connected thereto respectively. The non-fixed end of each of the short-segment connecting rods protrudes to form a mounting protrusion that matches the connecting-rod mounting groove, and a pin shaft mounting hole is formed on the mounting protrusion. The mounting protrusion is inserted into the mounting groove, and the connecting rod is separately fixed to the top support bar and the bottom support bar by means of a pin shaft, thereby forming an overall frame structure shown in FIG. 1. The foldable bag frame further includes a sleeve 11 slidable along the connecting rod, and a spring 12 fixedly connected to one end of the sleeve 11 and sleeved over an outer side of the connecting rod, the other end of the spring 12 being fixed to the non-fixed end of a short-segment connecting rod, that is, the end of the short-segment connecting rod that is away from the hinged portion. When the spring 12 is in an initial state, the sleeve 11 connected thereto covers the hinged portion of the connecting rod.

When the foldable bag frame is applied to a pet bag 17, the key also lies in the state of the frame; therefore, for the ease of description, outer coverings of the dog bag are removed, and are not shown in the figures. These coverings may be a cotton cloth, a canvas, PU, or other commonly used outer coverings.

During use, that is, when the entire frame is in an unfolded state, as shown in FIG. 1, the spring 12 is in the initial state, and the sleeve 11 covers the hinged portion of the connecting rod, that is, region m in FIG. 3; therefore, the connecting rod cannot be folded, and the entire frame is quite stable.

When the frame needs to be folded, the sleeve 11 is pushed toward the connecting rod, which is fixed to the sleeve 11 by means of the spring 12, and in this case, the spring 12 is compressed, the hinged portion, that is, region m, of the connecting rod is exposed, as shown in FIG. 2; therefore, the connecting rod is in a foldable state.

A force is applied to the connecting rods, so that the connecting rods 9, 9', 9", and 9'" respectively move toward and then overlap 10, 10', 10", and 10'", achieving a state shown in FIG. 3; in this case, the frame is completely folded, and the entire structure is in a planar form.

When the frame needs to be used again, the pull force on the sleeve 11 is removed, and the sleeve is pushed to the region m under a restoration force of the spring 12, thereby achieving the state shown in FIG. 1 again.

Embodiment 2

On the basis of Embodiment 1, it is disclosed that the spring is sleeved over the outer side of the upper short-segment connecting rod, as shown in FIG. 1, FIG. 2, and FIG. 3. The purpose of this is to make it convenient to operate the spring.

Embodiment 3

On the basis of the technical solution of Embodiment 1 or Embodiment 2, it is also disclosed that a fixing lug 13 is further formed on an outer wall of the sleeve. It is further disclosed that rope holes 15 for a rope to pass through are correspondingly formed on the top-support-bar connection joints or the bottom-support-bar connection joints. Fabric straps 16 for pulling the sleeves 11 are also shown in the figures.

In this way, the sleeve can be pulled by pulling the fixing lug with a rope or the like. This provides better operability for products using the frame, especially for pet bags such as dog bags that have outer coverings.

The above embodiments may be modified in one of the following two ways:

First, in the figures, the connecting rod is folded in a direction along the macro axis of the cube, making it possible to design a longer connecting rod; this however does not exclude the possibility of setting the folding direction of the connecting rod to a direction along the minor axis of the cube by changing the direction in which the mounting groove extends.

Second, when the spring is sleeved over the outer side of the lower short-segment connecting rod, or there are two springs separately sleeved over the outer side of the upper short-segment connecting rod and the outer side of the lower short-segment connecting rod, the mode of folding operation is the same as that in the embodiments, and folding of the frame is achieved by means of a lower fabric strap or a combination of an upper fabric strap and a lower fabric strap.

Figure 4:
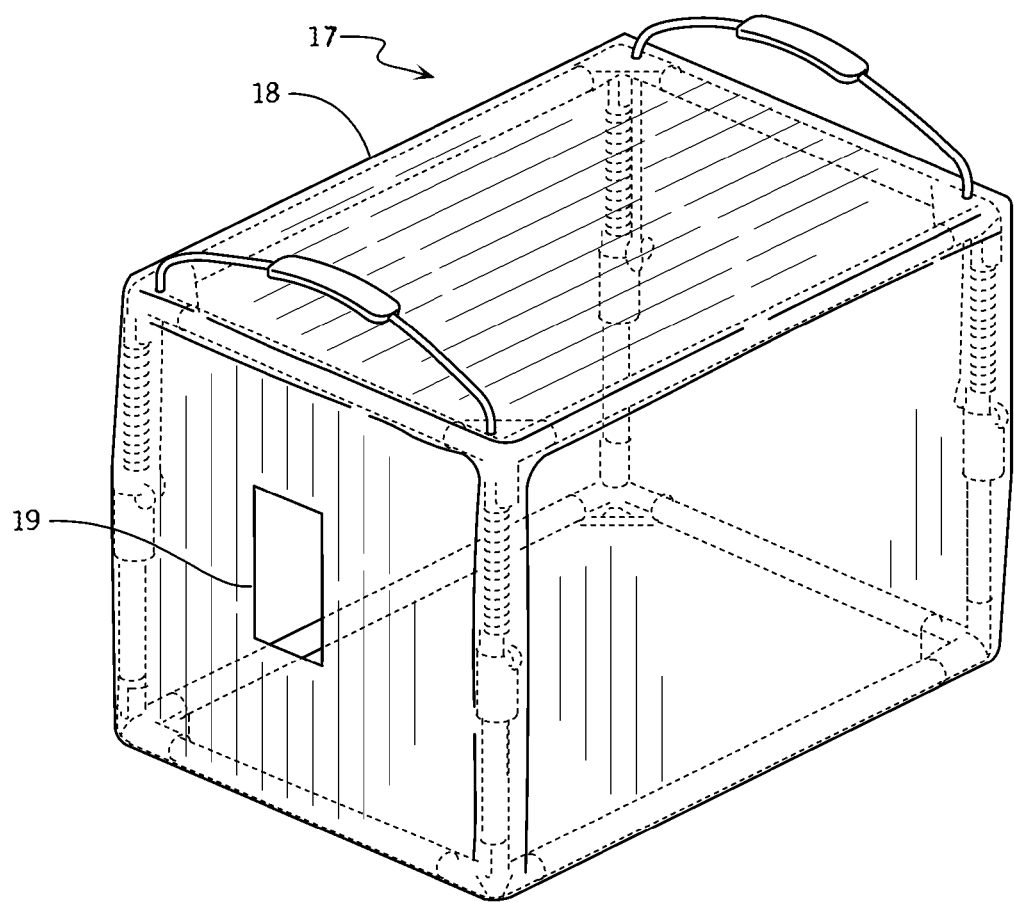
FIG. 4 is a reference diagram illustrating a pet bag using the foldable bag frame of the present invention.

As shown in FIG. 4, a pet bag 17 using the above foldable bag frame is particularly disclosed, where a bag body 18 is fixed at an outer layer of the foldable bag frame, the bag body is supported by the foldable bag frame to form a cubic accommodation space, and an opening 19 through which an animal breathes is formed on a side surface of the bag body 18.

The above descriptions are specific embodiments of the present invention. It should be noted that those of ordinary skill in the art can make improvements and modifications without departing from the spirit of the present invention, and such improvements and modifications shall be construed as falling within the protection scope of the present invention.

What is claimed is:

1. A foldable bag frame, comprising four top support bars connected end-to-end in sequence and four bottom support bars connected end-to-end in sequence, wherein neighboring top support bars are at an angle of 90°, the four top support bars form a rectangular top portion, top-support-bar connection joints are formed at the four vertices of the rectangular top portion, neighboring bottom support bars are at an angle of 90°, the four bottom support bars form a rectangular bottom portion, bottom-support-bar connection joints are formed at the four vertices of the rectangular bottom portion, upper-end connection protrusions are formed at the bottom of the top-support-bar connection joints, lower-end connection protrusions are correspondingly formed at the top of the bottom-support-bar connection joints, the upper-end connection protrusions and the lower-end connection protrusions each have a connecting-rod mounting groove correspondingly formed therein, and a shaft hole is correspondingly formed on a side wall of the mounting groove; further comprising connecting rods, wherein each of the connecting rods consists of two hingedly-connected short-segment connecting rods, the non-fixed end of each of the short-segment connecting rods protrudes to form a mounting protrusion that matches the connecting-rod mounting groove, a pin shaft mounting hole is formed on the mounting protrusion, the mounting protrusion is inserted into the mounting groove, and the connecting rod is separately fixed to the top support bar and the bottom support bar by means of a pin shaft; and further comprising a sleeve slidable along the connecting rod, and a spring fixedly connected to one end of the sleeve and sleeved over an outer side of the connecting rod, the other end of the spring being fixed to the non-fixed end of a short-segment connecting rod, wherein when the spring is in an initial state, the sleeve connected thereto covers the hinged portion of the connecting rod.

2. The foldable bag frame according to claim 1, wherein the spring is sleeved over the outer side of the upper short-segment connecting rod.

3. The foldable bag frame according to claim 2, wherein a fixing lug is further formed on an outer wall of the sleeve.

4. A pet bag using the foldable bag frame according to claim 3, wherein a bag body is fixed at an outer layer of the foldable bag frame, the bag body is supported by the foldable bag frame to form a cubic accommodation space, and an opening through which an animal breathes is formed on a side surface of the bag body.

5. The foldable bag frame according to claim 3, wherein rope holes for a rope to pass through are correspondingly formed on the top-support-bar connection joints or the bottom-support-bar connection joints.

6. A pet bag using the foldable bag frame according to claim 2, wherein a bag body is fixed at an outer layer of the foldable bag frame, the bag body is supported by the foldable bag frame to form a cubic accommodation space, and an opening through which an animal breathes is formed on a side surface of the bag body.

7. The foldable bag frame according to claim 1, wherein a fixing lug is further formed on an outer wall of the sleeve.

8. The foldable bag frame according to claim 7, wherein rope holes for a rope to pass through are correspondingly formed on the top-support-bar connection joints or the bottom-support-bar connection joints.

9. A pet bag using the foldable bag frame according to claim 8, wherein a bag body is fixed at an outer layer of the foldable bag frame, the bag body is supported by the foldable bag frame to form a cubic accommodation space, and an opening through which an animal breathes is formed on a side surface of the bag body.

10. A pet bag using the foldable bag frame according to claim 7, wherein a bag body is fixed at an outer layer of the foldable bag frame, the bag body is supported by the foldable bag frame to form a cubic accommodation space, and an opening through which an animal breathes is formed on a side surface of the bag body.

11. A pet bag using the foldable bag frame according to claim 1, wherein a bag body is fixed at an outer layer of the foldable bag frame, the bag body is supported by the foldable bag frame to form a cubic accommodation space, and an opening through which an animal breathes is formed on a side surface of the bag body.

12. The pet bag according to claim 11, wherein a rope is a fabric strap.

13. A foldable bag frame, comprising four top support bars connected end-to-end in sequence and four bottom support bars connected end-to-end in sequence, wherein neighboring top support bars are at an angle of 90°, the four top support bars form a rectangular top portion, top-support-bar connection joints are formed at the four vertices of the rectangular top portion, neighboring bottom support bars are at an angle of 90°, the four bottom support bars form a rectangular bottom portion, bottom-support-bar connection joints are formed at the four vertices of the rectangular bottom portion, upper-end connection protrusions are formed at the bottom of the top-support-bar connection joints, lower-end connection protrusions are correspondingly formed at the top of the bottom-support-bar connection joints, the upper-end connection protrusions and the lower-end connection protrusions each have a connecting-rod mounting groove correspondingly formed therein, and a shaft hole is correspondingly formed on a side wall of the mounting groove; further comprising connecting rods, wherein each of the connecting rods consists of three short-segment connecting rods hingedly connected in sequence, the non-fixed end of each of the short-segment connecting rods protrudes to form a mounting protrusion that matches the connecting-rod mounting groove, a pin shaft mounting hole is formed on the mounting protrusion, the mounting protrusion is inserted into the mounting groove, and the connecting rod is separately fixed to the top support bar and the bottom support bar by means of a pin shaft; and further comprising two sleeves slidable along the connecting rod, and a spring fixedly connected to one end of the sleeve and sleeved over an outer side of the connecting rod, the other end of the spring being separately fixed to the non-fixed ends of the upper short-segment connecting rod and the lower short-segment connecting rod, wherein when the spring is in an initial state, the sleeves connected thereto cover the hinged portions between the upper short-segment connecting rod and the lower short-segment connecting rod and between the hinged portion between the middle short-segment connecting rod and the lower short-segment connecting rod respectively.

14. The foldable bag frame according to claim 13, wherein a fixing lug is further formed on an outer wall of the sleeve.

15. The foldable bag frame according to claim 14, wherein rope holes for a rope to pass through are correspondingly formed on the top-support-bar connection joints or the bottom-support-bar connection joints.

16. A pet bag using the foldable bag frame according to claim 15, wherein a bag body is fixed at an outer layer of the foldable bag frame, the bag body is supported by the foldable bag frame to form a cubic accommodation space, and an opening through which an animal breathes is formed on a side surface of the bag body.

17. A pet bag using the foldable bag frame according to claim 14, wherein a bag body is fixed at an outer layer of the foldable bag frame, the bag body is supported by the foldable bag frame to form a cubic accommodation space, and an opening through which an animal breathes is formed on a side surface of the bag body.

18. A pet bag using the foldable bag frame according to claim 13, wherein a bag body is fixed at an outer layer of the foldable bag frame, the bag body is supported by the foldable bag frame to form a cubic accommodation space, and an opening through which an animal breathes is formed on a side surface of the bag body.

* * * * *